(12) United States Patent
Hess et al.

(10) Patent No.: US 8,770,637 B2
(45) Date of Patent: Jul. 8, 2014

(54) MODULE FOR ABSORBING ENERGY

(75) Inventors: Heiko Hess, Lauterecken (DE); Joachim Ruch, Wachenheim (DE); Jan Kurt Walter Sandler, Heidelberg (DE); Andreas Wuest, Zwingenberg (DE); Helge Weiler, Edingen-Neckarhausen (DE)

(73) Assignee: BASF SE, Ludwigshafen (DE)

( * ) Notice: Subject to any disclaimer, the term of this patent is extended or adjusted under 35 U.S.C. 154(b) by 37 days.

(21) Appl. No.: 13/177,893

(22) Filed: Jul. 7, 2011

(65) Prior Publication Data
US 2012/0009404 A1 Jan. 12, 2012

Related U.S. Application Data

(60) Provisional application No. 61/362,315, filed on Jul. 8, 2010.

(51) Int. Cl.
*B32B 7/02* (2006.01)

(52) U.S. Cl.
USPC .......................................... 293/120

(58) Field of Classification Search
USPC ................. 293/120–122, 115, 146–148, 117, 293/18–19, 107, 154–155; 296/193.09, 296/193.01, 187.03–187.04, 187.09, 187.11
See application file for complete search history.

(56) References Cited

U.S. PATENT DOCUMENTS 3,514,144 A * 5/1970 Alderfer ................... 293/107
3,694,018 A * 9/1972 Levering ................... 293/121
4,346,205 A * 8/1982 Hiles ........................ 528/53
4,762,352 A * 8/1988 Enomoto ................... 293/120
5,139,297 A * 8/1992 Carpenter et al. ........... 293/132
6,676,179 B2 * 1/2004 Sato et al. .................. 293/115
7,204,531 B2 * 4/2007 Kim .......................... 293/120
7,401,824 B2 * 7/2008 Condeelis .................. 293/121
7,410,018 B2 * 8/2008 Satou ....................... 180/68.4

(Continued)

FOREIGN PATENT DOCUMENTS

| EP | 0 323 038 A2 | 7/1989 |
| JP | 2004-168077 A | 6/2004 |
| KR | 10-0814862 B1 | 3/2008 |
| WO | WO 2008/016653 A2 | 2/2008 |

OTHER PUBLICATIONS

"Polypropylen", Wikipedia, der freie Enzyklopaedie, Feb. 9, 2009, XP-002661726, 4 pages.
Michael S. Found, "Experimental techniques and design in composite materials 4", A.A. Balkema, Swets & Zeitlinger B.V., 2002, XP-002661727, pp. 33-35.

(Continued)

*Primary Examiner* — Glenn Dayoan
*Assistant Examiner* — Sunsurraye Westbrook
(74) *Attorney, Agent, or Firm* — Oblon, Spivak, McClelland, Maier & Neustadt, L.L.P.

(57) ABSTRACT

The invention relates to a module for absorbing energy from an impact to which the module (3) has been subjected, via deformation, comprising a core (5) made of a polymer foam with a density of at most 0.2 g/cm³ and with a compressive modulus of elasticity of at most 200 MPa measured to DIN EN 826, wherein the core (5) has an at least to some extent enclosing shell (7) made of a polymer material, and/or comprises an insert (15) made of a polymer material, where the density of the polymer material of the shell (7) and/or of the insert (15) is at most 2.0 g/cm³ and its tensile modulus of elasticity is at least 700 MPa, measured to DIN EN ISO 527.

19 Claims, 3 Drawing Sheets

(56) References Cited

U.S. PATENT DOCUMENTS

| | | | |
|---|---|---|---|
| 7,575,259 B2 * | 8/2009 | Hasegawa | 293/120 |
| 7,625,022 B2 * | 12/2009 | Toneatti et al. | 293/120 |
| 8,168,096 B2 * | 5/2012 | Allmendinger et al. | 264/14 |
| 2007/0046044 A1 * | 3/2007 | Tanabe | 293/120 |

OTHER PUBLICATIONS

European Search Report issued Oct. 20, 2011 in European Patent Application No. 11 17 2692 (with English translation of categories of cited documents).

* cited by examiner

MODULE FOR ABSORBING ENERGY

The invention relates to a module for absorbing energy from an impact to which the module has been subjected, via deformation, where the module comprises a core made of a polymer foam.

Modules for absorbing energy from an impact to which the module has been subjected, via deformation, are used by way of example in automobile construction between the transverse bumper member and the bumper of a vehicle, in order to protect pedestrians. Modules currently used for absorbing energy in automobile construction are also termed crash absorbers and are produced by way of example from molded foams based on polypropylene, or from foams based on the polyurethane reaction. A characteristic feature of the materials of these systems is that they have low modulus of elasticity for static pressure load or dynamic impact load, with resultant large deformation distances.

Because there is a trend in the automobile industry toward construction of increasingly compact small cars, which by way of example require little parking space in urban use, there is also an attendant desire to reduce the maximum installation space necessary for the modules used to protect pedestrians. In order that pedestrians are nevertheless protected, the force exerted on the crash absorber is not permitted to exceed a maximum level and the energy has to be completely absorbed over a minimal deformation distance of the crash absorber. Various test methods are used to design crash absorbers, and these vary with the automobile manufacturer. This results in varying boundary conditions in respect of maximum permissible force-displacement factors and deformation distances.

A disadvantage of the crash absorbers currently used, made of an elastic, reversible foam material is that they require a prescribed minimum size in order to permit absorption of the necessary forces.

Another disadvantage of crash absorbers made of a foam material is that they do not have ideal absorption behavior. The force/displacement curve for ideal absorption behavior is rectangular. When the material is subject to a load, this provides an immediate increase in the force to the maximum permissible value, and said value then continues unchanged until it in turn falls back immediately to zero when the maximum desired deformation distance has been reached. When foam absorbers are subjected to a load, the result is not an immediate rise; instead the force initially rises rather slowly as the deformation distance increases.

The energy absorbed is depicted by the area under the respective graph or the area enclosed by the graph.

If the material is completely elastic, it resumes its original shape once the action of the force has ended. A semielastic material likewise undergoes reverse deformation, but without entirely then reaching its original shape.

Alongside crash absorbers made of a foam material, there are also known crash absorbers made of metal structures or of plastics structures, the design of these generally involving ribs or a honeycomb structure. A disadvantage of these crash absorbers designed in the form of a rib structure or honeycomb structure and made of metal or plastic is that they are usually subject to sudden failure rather than inhibiting uniform deformation when subjected to a force, for example caused by an impact.

It is therefore an object of the present invention to provide a module which can absorb energy from an impact to which the module has been subjected, via deformation, and which does not have the disadvantages known from the prior art. In particular, when the module absorbs energy its force/displacement curve is to be approximately ideal, and of approximately rectangular shape, and the deformation of the module during impact is to be in essence uniform.

The object is achieved via a module for absorbing energy from an impact to which the module has been subjected, via deformation, where the module comprises a core made of a polymer foam with a density of at most 0.2 g/cm$^3$ and with a compressive modulus of elasticity of at most 200 MPa measured to DIN EN 826, where the core has an at least to some extent enclosing shell made of a polymer material, and/or comprises an insert made of a polymer material, where the density of the polymer material of the shell and/or of the insert is at most 2.0 g/cm$^3$ and its tensile modulus of elasticity is at least 700 MPa, measured to DIN ISO 527, on a dry test specimen at room temperature.

By virtue of the structure of the invention, with a core made of a polymer foam and with the shell and/or the insert made of a polymer material, it is possible to achieve a curve shape which is approximately the ideal force/displacement curve shape. In particular, an almost immediate rise in the force is achieved, and the force continues to be almost constant after this rise until the maximum deformation distance has been reached. The effect of the shell and/or of the insert is that, when comparison is made with a crash absorber made of an unmodified polymer foam, the same amount of energy can be absorbed with a shorter deformation distance. This permits realization of smaller modules which absorb the same amount of energy. Overall, it can give a more compact structure.

Because the core made of polymer foam is used, when the module is subjected to an impact the force continues at a level which is in essence constant, with uniform deformation, and no sudden collapse occurs.

The density of the polymer foam used for the module in the invention is at most 0.2 g/cm$^3$. The density of the foam is preferably in the range from 0.01 to 0.2 g/cm$^3$. The density of the polymer foam is more preferably in the range from 0.02 to 0.1 g/cm$^3$, and in particular in the range from 0.03 to 0.06 g/cm$^3$.

The compressive modulus of elasticity of the polymer foam in the invention is at most 200 MPa. The compressive modulus of elasticity is preferably in the range from 0.05 to 200 MPa, more preferably in the range from 0.1 to 100 MPa, and in particular in the range from 0.2 to 50 MPa.

The density of the polymer material of the shell and/or of the insert in the invention is at most 2.0 g/cm$^3$. The density of the polymer material of the shell and/or of the insert is preferably smaller than 1.7 g/cm$^3$, and particularly preferably smaller than 1.4 g/cm$^3$.

The tensile modulus of elasticity of the polymer material of the shell and/or of the insert in the invention is at least 700 MPa. The tensile modulus of elasticity is preferably greater than 900 MPa, and particularly preferably greater than 1100 MPa.

The compressive modulus of elasticity of the polymer foam is measured to DIN EN 826.

The tensile modulus of elasticity of the polymer material of the shell and/or of the insert is measured to DIN EN ISO 527, using a tensile test which applies a quasistatic load to a dry test specimen at room temperature. The standard describes the geometry of the test specimen, the method for recording the values measured, the test velocity, and the method of evaluation. The result of the test is a stress-strain diagram, and from this it is possible to determine the tensile modulus of elasticity, yield stress, tensile strain at yield, tensile stress at break, tensile strain at break, tensile strength, and Poisson number.

Use of a polymer foam with a density of at most 0.2 g/cm$^3$, and with a compressive modulus of elasticity of at most 200

MPa, and of a shell and/or an insert made of a polymer material with a density of at most 2.0 g/cm³ and with a tensile modulus of elasticity of at least 700 MPa can achieve an increase in force under dynamic load of at least 400 N/mm, preferably at least 700 N/mm, and in particular at least 1000 N/mm, until a maximum permissible value for the effective force $F_{max}$ is reached. The maximum permissible force value $F_{max}$ is a function of the preferred application sector of the module, for example being a function of pedestrian-protection requirements or being a function of the requirement that costs for repair of minor damage be kept to a minimum.

By using computer-assisted optimization methods, it is possible to adjust the force curve to be sufficiently close to the ideal absorber characteristic (e.g. with a deviation of at most +/−15%), and it is moreover also possible to provide a different force profile which derives from a specific application, for example a force curve which falls away linearly once a particular deformation distance has been reached.

The polymer foam used for the module can be a polymer foam with a thermoplastic matrix or with a thermoset matrix. The production of the foam here uses processes known to the person skilled in the art. Suitable thermoplastic polymer foams which can be used for producing the module are foams composed of styrene (co)polymers, of polyolefins, of polyesters, of polyethers, of polyacrylates, of polyacetals, of polyamides, of polyurethanes, of polymers having vinyl groups, or of a combination of said plastics.

Examples of suitable styrene (co)polymers are glassclear polystyrene (GPPS), impact-modified polystyrene (HIPS), acrylonitrile-butadiene-styrene polymers (ABS), styrene-acrylonitrile polymers (SAN), or a mixture thereof, or else a mixture with polyphenylene ether (PPE).

Particularly suitable polyolefins are polyethylene (PE) and polypropylene (PP).

Examples of suitable polyamides are nylon-6,6, nylon-6, nylon-6,12, and nylon-6,10.

Particularly suitable polyesters are polyethylene terephthalate (PET) and polybutylene terephthalate (PBT). Polyoxymethylene (POM) is a particularly suitable polyacetal.

If the polymer foam used comprises a foam with thermoset matrix, it is preferable to use a polymer foam based on polyurethane.

The polymer material used for producing the polymer foam can have fiber reinforcement. Short fibers are preferably used for this purpose. Examples of suitable fibers are glass fibers, carbon fibers, aramid fibers, and natural fibers.

In one preferred embodiment, the polymer foam used, in particular in the event of use of a polymer foam based on thermoplastics, is a molded foam. The term molded foam here means a polymer foam which is composed of individual beads made of foamed polymer material, where the individual beads are sintered to one another. The sintering of the beads takes place by way of example with use of superheated steam. Moldings are produced by charging the beads to a porous mold and sintering them to one another in the mold. The resultant moldings can be removed after cooling and stabilization.

The polymer material of the shell and/or of the insert is preferably one selected from polyesters, polyamides, polyethers, polyacrylates, polyolefins, polyacetals, polymers composed of monomers comprising vinyl groups, styrene (co)polymers, and mixtures thereof.

Examples of suitable polyesters which can be used for producing the shell and/or the insert are polyethylene terephthalate and polybutylene terephthalate.

Examples of suitable polyamides are nylon-6, nylon-11, nylon-6,6, nylon-6,10, nylon-6,12, and nylon-12.

Examples of suitable polyethers which can be used for producing the shell and/or the insert are polyethylene glycol, polypropylene glycol, and polyether sulfones (PESU or PES).

Examples of suitable polyacrylates for producing the shell and/or the insert are poly(meth)acrylates, poly(meth)acrylate.

Examples of suitable polyolefins for producing the shell and/or the insert are polyethylene, polypropylene, poly-1-butene, and polytetrafluoroethene. Polyethylene used can comprise either HTPE or LTPE. HTPE here means high-temperature polyethylene, and LTPE here means a low-temperature polyethylene.

A particularly suitable polyacetal is polyoxymethylene.

Examples of suitable polymers made of monomers comprising vinyl groups are polyvinyl chloride, polyvinylidene chloride, polystyrene, impact-modified styrene, polyvinylcarbazole, polyvinyl acetate, and polyvinyl alcohol.

Examples of suitable styrene (co)polymers are styrene-acrylonitrile copolymers, acrylonitrile-butadiene-styrene copolymers, and styrene-butadiene copolymers.

Further, polyacrylonitrile are suitable.

Each of the polymers used here can be used individually or in a mixture.

The individual polymers for the shell and/or for the insert, and also for the core, can comprise admixtures of conventional additives, examples being plasticizers, crosslinking agents, impact modifiers, flame retardants, nanoparticles such as carbon nanotubes, $SiO_2$, $Al_2O_3$, or other additives which are known to the person skilled in the art and which depend on the nature of the application and which are usually added to polymers.

It is preferable that the polymer material of the shell and/or of the insert has been fiber-reinforced, in order to increase the strength of the shell and/or of the insert. Materials that can be used for reinforcement are either continuous-filament fibers, for example in the form of wovens or knits, or in the form of rovings, or long fibers or short fibers. It is preferable to use short fibers.

Particularly suitable fiber materials are carbon fibers, glass fibers, aramid fibers, natural fibers, basalt fibers, polymer fibers, or metal fibers. Fibers used particularly preferably comprise short glass fibers. Examples of suitable plastics for the insert and/or for the shell are short-glassfiber-reinforced engineering plastics, such as polyamide with 30% content of glass fibers.

If there is a shell made of a polymer material enclosing the core, the shell can enclose the core to some extent or completely. When the module is used in a motor vehicle, it is particularly preferable that the shell encloses the core only to some extent, so that the shell encloses the core on that side that faces toward the bumper. The only part that remains unsheathed in this instance is that side which faces toward the transverse member and which therefore faces away from the bumper.

If the core comprises an insert, this can by way of example have fillets, oriented at an angle smaller than 90° with respect to the direction from which the impact acts. The orientation of the fillets causes these to deform initially on exposure to an impact and finally to fracture on further exposure to the impact. Energy from the impact is thus absorbed. Specific design of the insert and/or of the shell can tune the fracture of the insert and/or of the shell in such a way that the desired force/displacement curve is obtained, for example by using computer-assisted design-optimization methods.

In order to increase the stability of the inserts, it is moreover advantageous that there are transverse fillets connecting adjacent fillets of the insert to one another. The connection here between the fillets and the transverse fillets can be right-angled. If the fillets and transverse fillets are designed in this way it is possible for example that the orientation of the fillets is perpendicular to the bumper support and that the orientation of the transverse fillets is parallel thereto. Another alternative possibility is that the fillets and the transverse fillets respectively are at an angle of 45° with respect to the bumper support. It is also possible to use any desired angle between said orientations.

Another possibility moreover is that the connection between fillets and transverse fillets does not use an angle of 90°, but instead the transverse fillets connect the individual fillets to one another at any desired other angle. One possibility here is that all of the transverse fillets have the same angle, or that the transverse fillets have different angles. The transverse fillets can by way of example also be of zig-zag or undulating design between the individual fillets.

Another possibility is that the insert has been designed by way of example in the form of a T profile or of a double-T profile, or else in the form of a U profile. If the insert has been designed in the form of a U profile, this can have been designed either as a rounded-off profile or as an angular profile.

In another embodiment of the invention, the insert can also take the form of cylinder segments respectively oriented in opposite direction.

Another possibility is to use inserts of which the cross section changes in the direction of the effective force. This method can be used to achieve appropriate adaptation of the insert in such a way that failure leads to an approximately ideal force/displacement curve.

In order to obtain a stable connection of shell and/or insert and of the core, it is possible by way of example to adhesive-bond, or to weld, the insert and/or the shell to the core. However, another alternative possibility by way of example provides an interlock bond of insert and/or shell to the core. The adhesive bond or weld, or the interlock bond, prevents easy separation of the shell and/or insert from the core.

The module of the invention is particularly suitable as absorber structure which can protect pedestrians and which has been arranged between a transverse member and a bumper of a motor vehicle.

The module of the invention can be used not only in a motor vehicle as absorber structure to protect pedestrians but also as absorber in the field of packaging of goods of any type, in particular of high-quality goods. Another possible use is for the damping of impacts in the protection of motor-vehicle occupants, for example in the event of impact of the head on the instrument panel, or as knee cushioning, or as insert in seats to protect the rear passengers, or as insert in door cladding, in the roof lining, or in the A-, B-, or C-column.

In the case of the module of the invention, it is unnecessary that the combination of polymer foam and shell and/or insert has a compact structure which completely fills the entire installation space, for example between transverse member and bumper. In contrast, it is possible to use specific variation of the geometry to design regions which comprise neither polymer foam nor shell and/or insert, and which permit deformation of the modules into said region that has not initially been filled.

The component of the invention can by way of example be produced by a process which provides foam around shell and/or insert, or which encloses shell and/or insert in foam. Another possibility is to use a subsequent, separate operation to connect the core and the shell and/or the insert to one another, for example via snap connections, adhesive bonding, etc. This clearly also provides the possibility of designing the characteristic, i.e. the force/displacement curve, of the module for the specific application via specific change of the materials, for example via change of foam density, of fiber content, and/or of materials selected, and to adapt the characteristic appropriately to said application without any requirement for other production tooling.

The drawing shows examples of the invention, and these are explained in more detail in the description hereinafter.

FIG. 1 shows a three-dimensional diagram of a first embodiment of a transverse member of a motor vehicle with the module of the invention for absorbing energy.

Attached to a transverse member 1 for a bumper, there is a module 3 for absorbing energy from an impact to which the module has been subjected.

Figure 1:
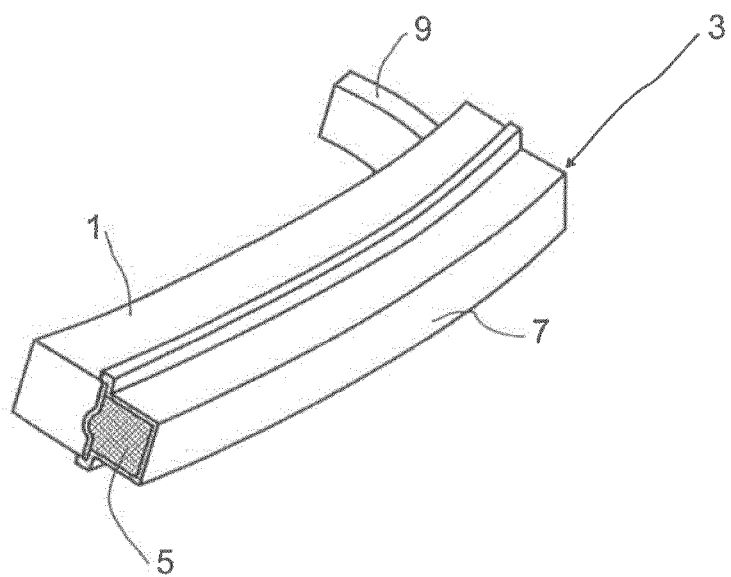
FIG. 1 shows: a three-dimensional diagram of a first embodiment of a transverse member with module for absorbing energy.

In the embodiment shown in FIG. 1, the module 3 comprises a core 5 made of a polymer foam, manufactured from a shell 7 made of a polymer material with a density of at most 2.0 g/cm$^3$ and with a tensile modulus of elasticity of at least 700 MPa. When the module 3 for absorbing energy is exposed to an impact, the shell 7 first absorbs energy. When a maximum force, dependent on geometry and material, and acting on the shell 7, has been reached, the shell 7 deforms and fractures. This results in an almost perpendicular rise in the force/displacement curve. Once the shell 7 has failed, for example via fracture, further energy is absorbed by the core 5 made of the polymer foam. An almost rectangular shape of the force/displacement curve can thus be realized.

The module 3 for absorbing energy when an impact is encountered is usually used for protection of pedestrians, having been mounted between the transverse member 1 and a bumper not shown in FIG. 1. A "crashbox" 9 is usually used in assembly of the transverse member 1 on the vehicle bodywork. The crashbox 9 also absorbs energy by deforming when the bumper and the transverse member 1 are exposed to a force.

Any desired method known to the person skilled in the art can be used to secure the module 3 for absorbing energy on the transverse member 1. By way of example, it is therefore possible to use an interlock bond or a frictional bond. By way of example, the module 3 can be secured to the transverse member 1 by a method involving screw threads or rivets. Bonding via clamping or via adhesive-bonding is also possible. If the transverse member 1 is manufactured from a plastics material, it is moreover also possible that the module 3 is welded to the transverse member 1.

Figure 2:
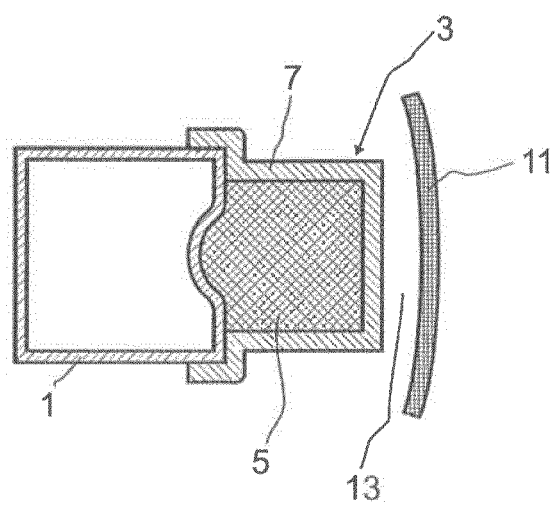
FIG. 2 shows: a cross-sectional view of the structure shown in FIG. 1.

FIG. 2 shows a cross-sectional view of the composite shown in FIG. 1.

The module 3 for absorbing energy, comprising the core 5 and the shell 7, has been connected to the transverse member 1. The design of the shell 7 here is such that it protrudes over the transverse member 1. The connection of transverse member 1 and module 3 can then by way of example be achieved by using that part of the shell 7 that protrudes over the transverse member 1.

Adjacent to the module 3 is the bumper 11. The bumper 11 is usually not in contact with the module 3, but instead there is usually a gap 13 between bumper 11 and module 3. In the event of an impact, the bumper 11 then first moves in the direction of the module 3, which then absorbs the force acting on the bumper 1. As soon as the bumper 1 encounters the shell 7, the force acts on the shell 7 until this deforms and fails. Once the shell 7 has failed, the force then continues to act on the core 5 made of polymer foam. This causes further deformation of the module 3 in that the polymer foam becomes compressed until it has reached its maximum density and cannot be further compressed.

Figure 3:
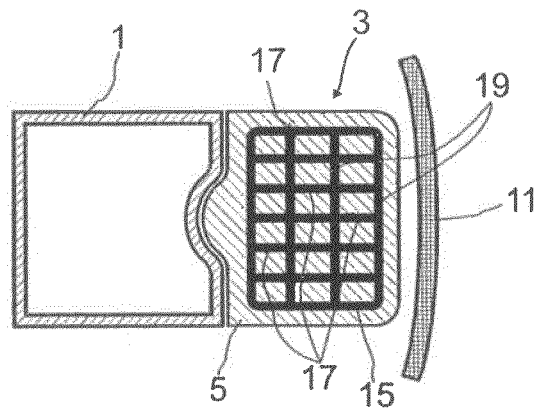
FIG. 3 shows: a cross-sectional view of a second embodiment of a transverse member with module for absorbing energy and bumper.

As an alternative to the shell 7 shown in FIG. 2, another possibility is to use an insert which has been filled by, and enclosed by, the polymer foam of the core 5. FIG. 3 shows this type of module with insert.

The structure of the composite made of transverse member 1, module 3 for absorbing energy, and bumper 11 corresponds to that shown in FIG. 2. Unlike the embodiment shown in FIG. 2, the embodiment shown in FIG. 3 has, instead of a shell, an insert 15, which has been inserted into the core 5 made of polymer material. The insert 15, like the shell 7, is manufactured from a polymer material which has a density of at most 2.0 g/cm³ and a tensile modulus of elasticity of at least 700 MPa, measured to DIN EN ISO 527.

In the embodiment shown in FIG. 3, the insert 15 is composed of fillets 17 which extend from the transverse member 1 in the direction of the bumper 11. There are transverse fillets 19 connecting the individual fillets 17 to one another. In the embodiment shown here, the transverse fillets 19 have been arranged perpendicularly with respect to the fillets 17 and run parallel to transverse member 11 and bumper 1. As an alternative to the embodiment shown in FIG. 3, it is also possible that the transverse fillets 19 do not run parallel to bumper 11 and transverse member 1, but instead run at an angle. A zig-zag design or undulating design is also possible.

FIGS. 4 to 8 show further alternative embodiments for the insert 15.

Figure 4:
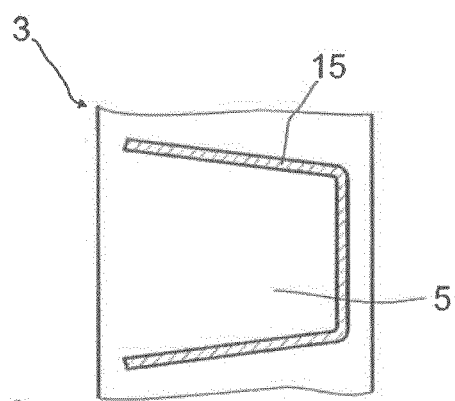
FIGS. 4 to 8 show various geometries for inserts.
Figure 5:
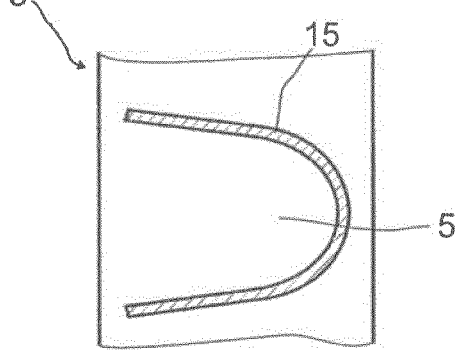
Figure 6:
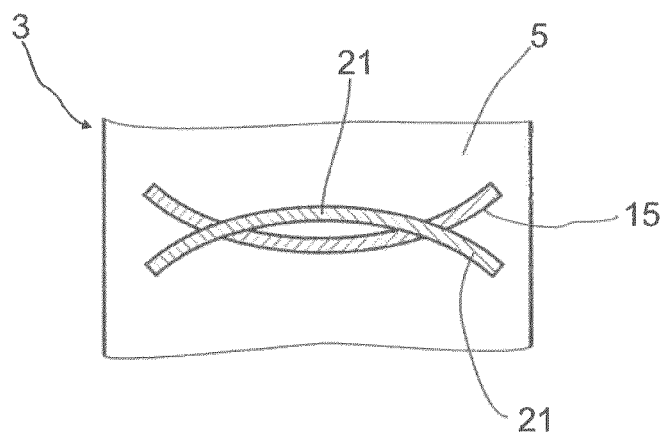

In FIGS. 4 and 5, the insert has been designed in the form of U-shaped profile. The shape of the insert 15 here corresponds in essence to the shell 7 shown in FIGS. 1 and 2. However, unlike a shell, the insert 15 is completely enclosed by the polymer foam of the core 5. If the insert 15 has been designed in the form of U-shaped profile, as shown in FIGS. 4 and 5, the module 3 is preferably secured to the open side of the insert 15 designed in the form of U-shaped profile on the transverse member 1. The force therefore initially acts on the closed side of the insert 15 designed in the form of U-shaped profile.

In another possible alternative, the insert 15 is designed as cylinder segments 21. It is advantageous here that respectively two cylinder segments intersect. Another alternative possibility here is that respectively short sections of the cylinder segments 21 are provided, respectively arranged in opposite orientation alongside one another in the polymer foam of the core 5. The cylinder segments 21 can by way of example be connected by an assembly method involving insertion of respectively adjacent cylinder segments 21 into slits formed in the cylinder segments 21.

Figure 7:
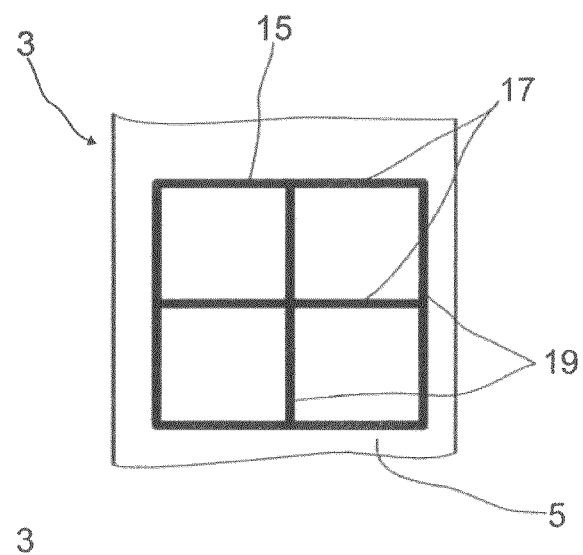

The embodiment shown in FIG. 7 and comprising fillets 17 and transverse fillets 19 corresponds to the embodiment shown in FIG. 3, except that the number of fillets 17 and transverse fillets 19 is smaller. In the embodiment shown in FIG. 7, the arrangement of the fillets 17 is right-angled with respect to the transverse fillets 19.

Figure 8:
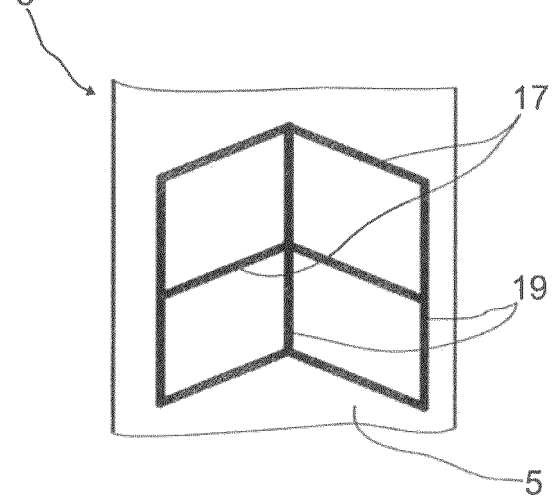

In another alternative possibility, the fillets 17 which run from the transverse member 1 in the direction of the bumper 11 are designed by way of example in zig-zag shape or in undulating shape. FIG. 8 shows a zig-zag design of the fillets 17. In the embodiment shown in FIG. 8, the fillets 17 have also been connected to one another via transverse fillets 19. As an alternative to the transverse fillets 19 shown in FIG. 8 it is also possible that the transverse fillets 19 are likewise designed in zig-zag shape or in undulating shape. The orientation of the zig-zag design here can be either in the direction from above to below or else in the direction from left to right, in each case based on the transverse member on the motor vehicle.

However, any other desired design of an insert 15 which initially absorbs the force and fails on exposure to a prescribed maximum force is also possible, alongside the embodiments shown.

A further possibility uses a shell 7 and an insert 15. The insert 15 can assume any desired geometry. The shell 7 has already been designed so that it encloses the core 5.

The invention claimed is:

1. A module for absorbing energy from an impact to which the module has been subjected, via deformation, comprising a core made of a polymer foam with a density of at most 0.2 g/cm³ and with a compressive modulus of elasticity of at most 200 MPa measured to DIN EN 826, wherein the core comprises an insert made of a polymer material and is formed of cylinder segments respectively oriented in opposite direction, wherein respectively two cylinder segments intersect or where respectively short sections of the cylinder segments are provided, respectively arranged in opposite orientation alongside one other in the polymer foam of the core, where the density of the polymer material of the insert is at most 2.0 g/cm³ and its tensile modulus of elasticity is at least 700 MPa, measured to DIN EN ISO 527.

2. The module according to claim 1, wherein the polymer foam comprises a thermoplastic matrix or a thermoset matrix.

3. The module according to claim 1 or 2, wherein the polymer foam is composed of one or more polymers selected from the group consisting of a styrene (co)polymer, a polyolefin, a polyester, a polyether, a polyacrylate, a polyacetal, a polyamide, a polyurethane and a polymer having a vinyl group.

4. The module according to claim 1, wherein the polymer foam is a molded foam.

5. The module according to claim 1, wherein the polymer material of the insert is selected from the group consisting of a polyester, a polyamide, a polyether, a polyacrylate, a polyolefin, a polyacetal, a polymer composed of monomers comprising vinyl groups, a styrene (co)polymer, and mixtures thereof.

6. The module according to claim 1, wherein the polymer material of the insert has fiber-reinforcement.

7. The module according to claim 1, wherein the insert has been adhesive-bonded to, or welded to, the core.

8. The module according to claim 1, wherein the insert has been interlock-bonded to the core.

9. The module according to claim 1, wherein the insert has fillets oriented at an angle smaller than 90° with respect to the direction from which the impact acts.

10. The module according to claim 9, wherein transverse fillets connect adjacent fillets of the insert to one another.

11. The module according to claim 1, wherein the module is an absorber structure to protect pedestrians and has been arranged between a transverse member and bumper of a motor vehicle.

12. The module according to claim 1, comprising an enclosing shell comprising a polymer material.

13. the module according to claim 12, wherein the density of the polymer material of the shell is at most 2.0 g/cm3 and its tensile modulus of elasticity is at least 700 MPa, measured to DIN EN ISO 527.

14. The module according to claim 12, wherein the polymer material of the shell and/or of the insert is selected from the group consisting of a polyester, a polyamide, a polyether, a polyacrylate, a polyolefin, a polyacetal, a polymer composed of monomers comprising vinyl groups, a styrene (co) polymer, and mixtures thereof.

15. The module according to claim 12, wherein the polymer material of the shell and/or of the insert has fiber-reinforcement.

16. The module according to claim 12, wherein the insert and/or the shell has been adhesive-bonded to, or welded to, the core.

17. The module according to claim 12, wherein the insert and/or the shell has been interlock-bonded to the core.

18. The module according to claim 12, wherein the shell encloses the core to some extent or completely.

19. The module according to claim 1, wherein the insert has a cross section which changes in the direction of the effective force to achieve appropriate adaptation of the insert in such a way that failure leads to an approximately ideal force/displacement curve.

\* \* \* \* \*